US012485672B2

(12) United States Patent
Kawamura

(10) Patent No.: US 12,485,672 B2
(45) Date of Patent: Dec. 2, 2025

(54) LIQUID EJECTION HEAD AND METHOD OF MANUFACTURING LIQUID EJECTION HEAD

(71) Applicant: CANON KABUSHIKI KAISHA, Tokyo (JP)

(72) Inventor: Shogo Kawamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 123 days.

(21) Appl. No.: 18/537,990

(22) Filed: Dec. 13, 2023

(65) Prior Publication Data

US 2024/0217235 A1 Jul. 4, 2024

(30) Foreign Application Priority Data

Dec. 28, 2022 (JP) ................................ 2022-211358

(51) Int. Cl.
*B41J 2/14* (2006.01)
*B41J 2/16* (2006.01)

(52) U.S. Cl.
CPC ......... *B41J 2/14201* (2013.01); *B41J 2/1607* (2013.01); *B41J 2/1637* (2013.01)

(58) Field of Classification Search
CPC .... B41J 2/14201; B41J 2/1607; B41J 2/1637; B41J 2/1623; B41J 2/1603
See application file for complete search history.

(56) References Cited

U.S. PATENT DOCUMENTS

| | | | | |
|---|---|---|---|---|
| 8,012,538 | B2 | 9/2011 | Yokouchi | |
| 2010/0026766 | A1 * | 2/2010 | Nagata | B41J 2/1433 347/65 |
| 2011/0285789 | A1 | 11/2011 | Yokouchi | |

FOREIGN PATENT DOCUMENTS

| | | | |
|---|---|---|---|
| JP | 2009-208349 | A | 9/2009 |

* cited by examiner

*Primary Examiner* — Lisa Solomon
(74) *Attorney, Agent, or Firm* — Venable LLP

(57) ABSTRACT

A liquid ejection head is a liquid ejection head including a printing element substrate including a plate provided with an ejection port from which ink is ejected, including: a first groove that is provided around the plate of the printing element substrate; a second groove that is provided on the printing element substrate and in communication with the first groove through a communication portion; and a resin portion that is provided in the first groove, the communication portion, and in the second groove and protrudes from the plate in a direction crossing a surface of the plate.

13 Claims, 9 Drawing Sheets

LIQUID EJECTION HEAD AND METHOD OF MANUFACTURING LIQUID EJECTION HEAD

BACKGROUND OF THE INVENTION

Field of the Invention

The present disclosure relates to a liquid ejection head and a method of manufacturing the liquid ejection head.

Description of the Related Art

In a case where printing is performed, in a liquid ejection head of a printer, a nozzle surface from which ink is ejected is adjacent to a printing medium. For this reason, the printing medium is in contact with the nozzle surface during printing in some cases, and this may cause wearing and damage of the nozzle surface and a deterioration of the printing quality. In order to suppress the wearing and damage of the nozzle surface of the liquid ejection head, there has been known a configuration in which a cover member is provided around the nozzle surface as described in Japanese Patent Laid-Open No. 2009-208349 (hereinafter, referred to as PTL 1). As a method of manufacturing the cover member, there has been known a method of forming a protrusion portion structure on the nozzle surface by applying curable resin by a dispenser (a liquid resin container).

In a case where a protection structure is manufactured by applying the resin to the nozzle surface, there is a possibility that non-ejection occurs due to an air bubble in the liquid resin container applying the resin, a nozzle plate is splashed with the resin due to blowing of air, and a resin pool is generated in a portion from which the applying starts or a portion at which the applying ends.

SUMMARY OF THE INVENTION

A liquid ejection head is a liquid ejection head including a printing element substrate including a plate provided with an ejection port from which ink is ejected, including: a first groove that is provided around the plate of the printing element substrate; a second groove that is provided on the printing element substrate and in communication with the first groove through a communication portion; and a resin portion that is provided in the first groove, the communication portion, and in the second groove and protrudes from the plate in a direction crossing a surface of the plate.

Further features of the present invention will become apparent from the following description of exemplary embodiments with reference to the attached drawings.

DESCRIPTION OF THE EMBODIMENTS

The present disclosure can be applied to not only a general printing apparatus but also an apparatus such as a copier, a facsimile including a communication system, and a word processor including a printing unit, and an industrial printing apparatus that is compositely combined with various processing devices.

Descriptions below are not intended to limit the scope of the present disclosure. For instance, although a liquid ejection head of the present embodiment employs a thermal method by which the liquid is ejected by an air bubble generated by a heating element, it is possible to apply the present disclosure also to a liquid ejection head employing a piezoelectric method and other various liquid ejection methods.

In the present disclosure, an X axis, a Y axis, and a Z axis are used as needed as a directional axis to describe a layout and the like of a liquid ejection head 3. The X axis and the Y axis are orthogonal to each other on a horizontal plane and form a plane on which the liquid ejection head 3 is disposed. The Z axis is a vertical axis orthogonal to the X axis and the Y axis and is equal to a direction in which resin is applied, as described later.

First Embodiment (Liquid Ejection Head)

Figure 1:
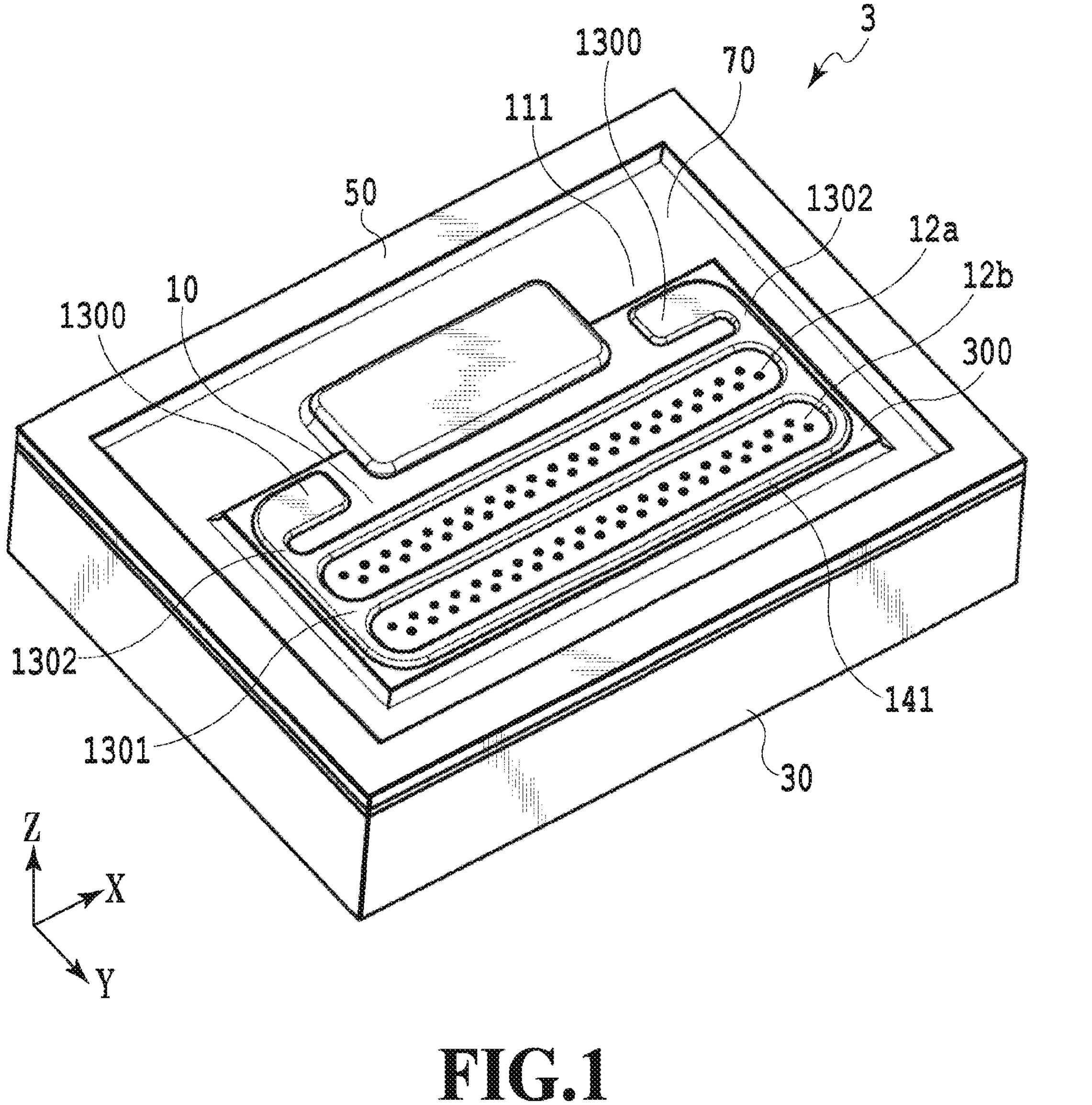
FIG. 1 illustrates a perspective view of a liquid ejection head of a first embodiment.

The liquid ejection head 3 of the present disclosure includes a printing element substrate 10 including nozzle plates 12*a* to 12*b* and a groove 1301 surrounding the nozzle plates 12*a* to 12*b*, a communication portion 1302, a liquid resin pooling portion 1300, and a resin portion 141, which are formed on the printing element substrate 10. The resin portion 141 is provided in the groove 1301, the communication portion 1302, and the liquid resin pooling portion 1300. FIG. 1 illustrates the liquid ejection head of a first embodiment. The liquid ejection head 3 includes a housing including a support member 30 and a frame member 50 and a liquid ejection unit 300 arranged in the housing. A support plate 70 includes a liquid flow channel to supply ink to the nozzle plates through the printing element substrate 10. The liquid ejection unit 300 is arranged in the housing and is fixed by a sealing member 111 filled in a periphery thereof. The nozzle plates may be simply referred to as plates.

(Liquid Ejection Unit)

Figure 2A:
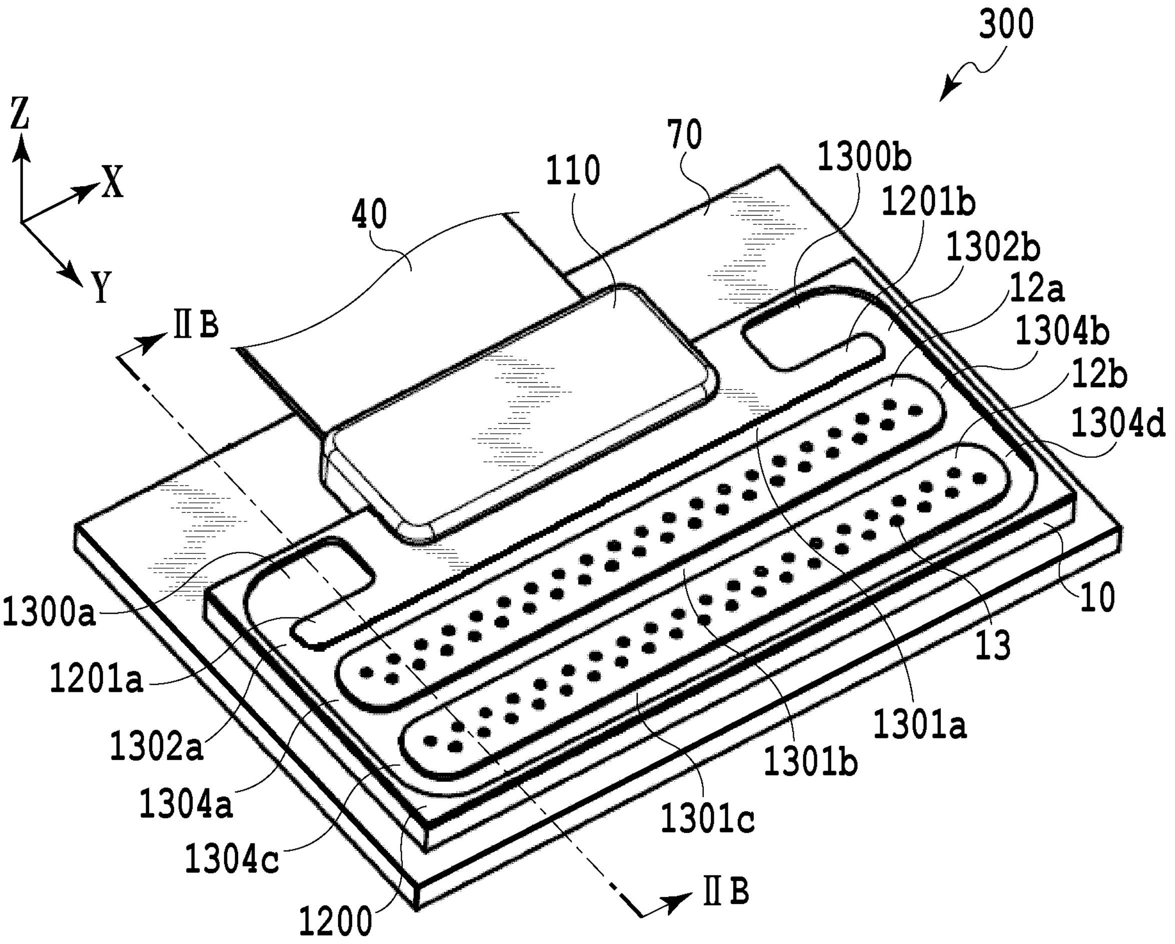
FIG. 2A illustrates a liquid ejection unit before a protection structure of the first embodiment is manufactured.
Figure 2B:
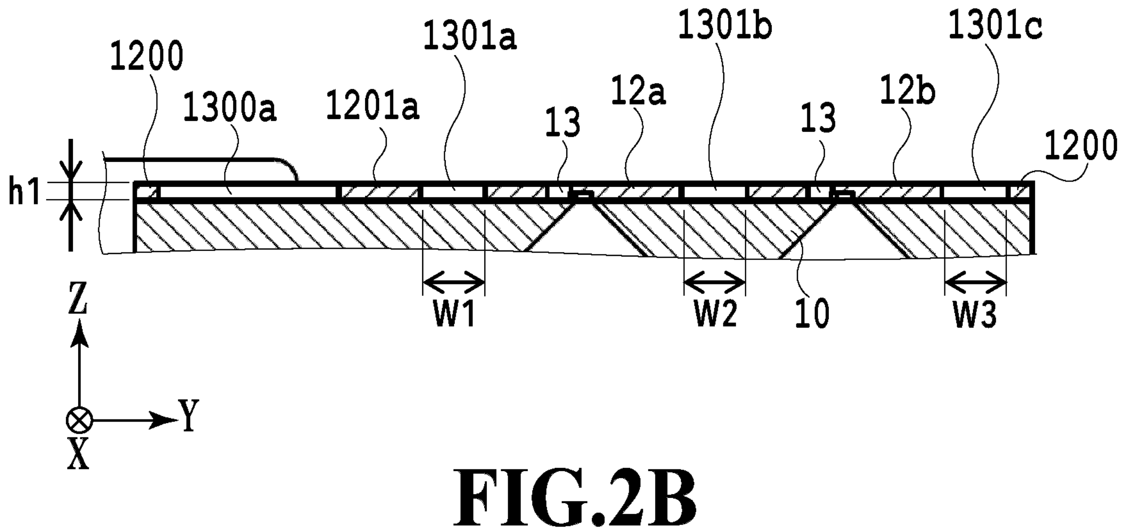
FIG. 2B illustrates a liquid ejection unit before a protection structure of the first embodiment is manufactured.

FIG. 2 illustrates the liquid ejection unit 300 before the resin is injected. FIG. 2A is perspective view of the liquid ejection unit 300 before the resin injection, and FIG. 2B is a cross-sectional view of the liquid ejection unit 300 that is taken along IIb-IIb.

As illustrated in FIG. 2A, the liquid ejection unit 300 includes the support plate 70, the printing element substrate 10, the nozzle plates 12*a* to 12*b*, a dam 1200, partition walls 1201*a* to 1201*b*, and a sealing member 110. The printing element substrate 10 is an Si substrate having a thickness of about 0.6 mm to 1 mm and includes an electric circuit, a heat generation resistor, a terminal producing an electric connection, and a flow channel arranged therein. The printing element substrate 10 is parallel to the X axis and the Y axis and forms a plane. The printing element substrate 10 is arranged on the support plate 70 and is electrically connected with a flexible wiring substrate 40 applying a driving signal and the like from a printing apparatus main body. The flow channel arranged in the printing element substrate 10 is in fluid communication with the liquid flow channel in the support plate 70.

The nozzle plates 12*a* to 12*b* are arranged on the printing element substrate 10 and each include an ejection port 13 that ejects an ink droplet. The ejection port 13 is in fluid communication with the flow channel in the support plate 70 and the flow channel in the printing element substrate 10. The dam 1200 is arranged on the printing element substrate 10 and surrounds the nozzle plates 12*a* to 12*b* at a distance therefrom. The partition walls 1201*a* to 1201*b* are arranged at a distance from the nozzle plates 12*a* to 12*b* in a region of the printing element substrate 10 defined by the dam 1200 and may be integrally molded with or put in contact with the dam 1200. Opposite surfaces of surfaces of the nozzle plates 12*a* to 12*b*, the dam 1200, and the partition walls 1201*a* to 1201*b*, which are in contact with the printing element substrate, may be subjected to water-repellent treatment. The nozzle plates 12*a* to 12*b*, the dam 1200, and the partition walls 1201*a* to 1201*b* may be formed by patterning a water-repellent treated surface.

Next, a groove to form the resin portion is described. The nozzle plates 12*a* to 12*b*, the dam 1200, and the partition walls 1201*a* to 1201*b* define grooves 1301*a* to 1301*c* and grooves 1304*a* to 1304*d* surrounding the nozzle plates on the printing element substrate 10. The dam 1200 and the partition walls 1201*a* to 1201*b* define communication portions 1302*a* to 1302*b* and liquid resin pooling portions 1300*a* to 1300*b* on the printing element substrate 10. The liquid resin pooling portion 1300*a* is in communication with each of the grooves 1301*a* to 1301*c* and the grooves 1304*a* to 1304*d* through the communication portion 1302*a*, and the liquid resin pooling portion 1300*b* is in communication with each of the grooves 1301*a* to 1301*c* and the grooves 1304*a* to 1304*d* through the communication portion 1302*b*. The grooves 1301*a* to 1301*c* and the grooves 1304*a* to 1304*d* may be referred to as a first groove, and the liquid resin pooling portions may be referred to as a second groove.

The groove, the communication portion, and the liquid resin pooling portion each include a corner portion in a view from a Z direction, and the corner portion may have an arc shape. The sealing member 110 covers an electric connection portion between the printing element substrate 10 and the flexible wiring substrate 40 and is arranged at a distance from the grooves 1301*a* to 1301*c*, the grooves 1304*a* to 1304*d*, the communication portions 1302*a* to 1302*b*, and the liquid resin pooling portions 1300*a* to 1300*b*.

As illustrated in FIG. 2B, the nozzle plates 12*a* to 12*b*, the dam 1200, and the partition walls 1201*a* to 1201*b* may have an equal height h1 in a +Z direction from the printing element substrate 10, and the height h1 may be 0.02 mm to 0.05 mm. Widths w1 to w3 of the grooves 1301*a* to 1301*c* may be equal to each other, and each of the widths w1 to w3 may be 0.1 mm to 0.3 mm. The liquid resin pooling portions 1300*a* to 1300*b* secure a sufficient region for the accuracy of the resin application and the splashing of the resin.

(Molding Method)

Figure 3A:
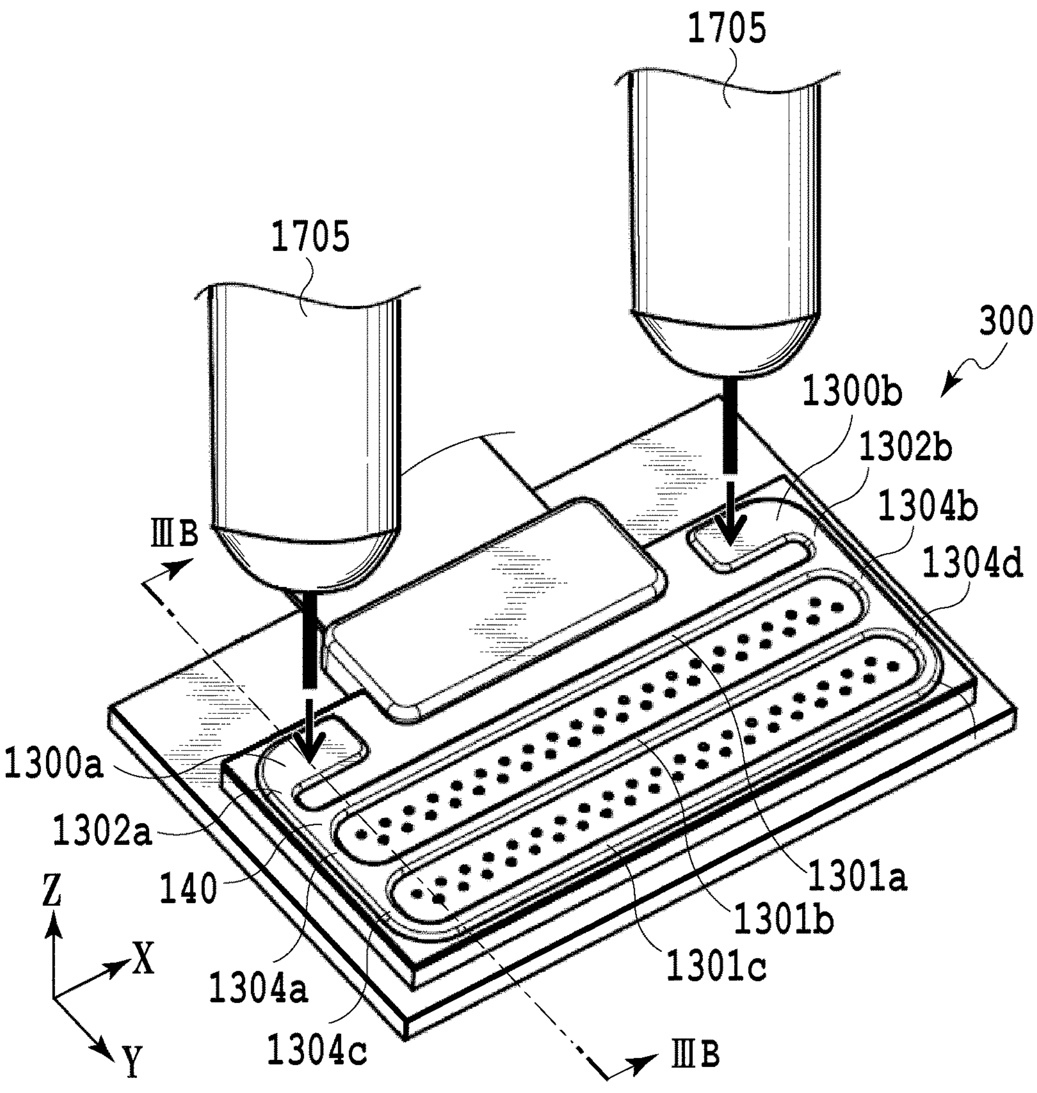
FIG. 3A illustrates a manufacturing process of the protection structure of the liquid ejection unit of the first embodiment.

Next, a method of applying liquid resin 140 to the liquid ejection unit 300 is described. FIG. 3 illustrates the liquid ejection unit 300 in the resin injection. FIG. 3A is a perspective view of the liquid ejection unit 300 in the resin injection, and FIG. 3B is a cross-sectional view of the liquid ejection unit 300 that is taken along IIIb-IIIb.

As illustrated in FIG. 3A, a liquid resin container 1705 injects the liquid resin into the liquid resin pooling portions 1300*a* to 1300*b*. The liquid ejection unit 300 is heated to 40° C. to 70° C. by a work fixation stage 1704 (see FIG. 8 described later), and thus the viscosity of the liquid resin 140 applied to the liquid resin pooling portions 1300*a* to 1300*b* is reduced. The liquid resin 140 is heated for three to ten minutes and flows to the grooves 1301*a* to 1301*c* and the grooves 1304*a* to 1304*d* from the liquid resin pooling portion 1300*a* through the communication portion 1302*a* and from the liquid resin pooling portion 1300*b* through the communication portion 1302*b*. Subsequently, the liquid resin 140 fills the liquid resin pooling portions 1300*a* to 1300*b*, the communication portions 1302*a* to 1302*b*, the grooves 1301*a* to 1301*c*, and the grooves 1304*a* to 1304*d*.

Figure 3B:
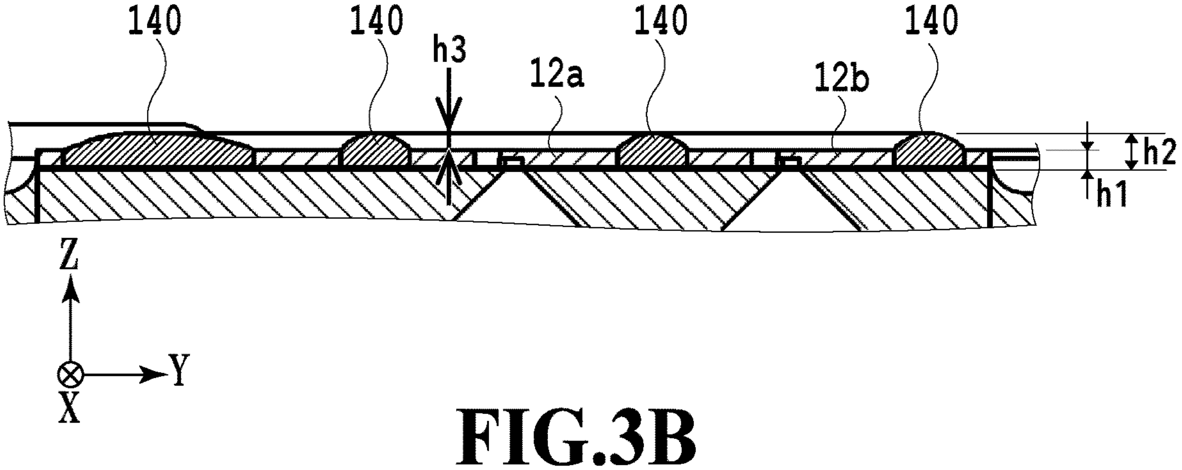
FIG. 3B illustrates a manufacturing process of the protection structure of the liquid ejection unit of the first embodiment.

As illustrated in FIG. 3B, the nozzle plates 12*a* to 12*b*, the dam 1200, and the partition walls 1201*a* to 1201*b* have the same heights, and the corner portions of the liquid resin pooling portions 1300*a* to 1300*b*, the communication portions 1302*a* to 1302*b*, the grooves 1301*a* to 1301*c*, and the grooves 1304*a* to 1304*d* have an arc shape. The shape can allow the liquid resin 140 filled in the groove to maintain the surface tension and to swell in the +Z direction to be higher than the height h1 while preventing leaking to the outside. Additionally, the equal widths w1 to w3 of the grooves 1301*a* to 1301*c* may uniform heights of protrusion shapes formed by the surface tension of the liquid resin 140 overall.

(Curing of Resin)

After the filling of the liquid resin 140, the liquid ejection unit 300 may be detached from the stage 1704, put into an oven, heated at 80° C. to 160° C. for two to six hours, and thermally cured. The liquid resin 140 after the thermal curing has a higher elasticity than that of the nozzle plates 12*a* to 12*b*.

Alternatively, the liquid resin 140 may be ultraviolet ray curable liquid resin, and after the filling of the liquid resin 140, the liquid resin may be cured by irradiation with ultraviolet rays. The liquid resin 140 after the ultraviolet ray curing has a higher elasticity than that of the nozzle plates 12*a* to 12*b*.

The cured liquid resin 141 surrounds the nozzle plates 12*a* to 12*b*, has a height h2, and forms a protection structure protruding in a direction crossing a surface of the nozzle plate. It is $h1<h2$, and a difference h3 between h2 and h1 may be 0.03 mm to 0.1 mm, for example.

For example, the liquid resin 140 used in the present disclosure uses resin with good permeability such as an underfill material and the like for flip chip that is used for bare chip implementation, and the resin may be specifically an underfill material for flip chip that contains epoxy resin as a main component. The liquid resin 140 may have a characteristic that the viscosity that is about 5 Pa·s at a normal temperature is reduced to 1.5 Pa·s or less by being heated at 40° C. to 70° C. The height of the liquid resin 140 may be controlled by a sensor (not illustrated) that detects a resin amount. The numbers of the above-described liquid resin pooling portions, communication portions, and grooves are an example, and it is not limited to the above-described numbers.

According to the present embodiment, it is possible to provide a protection structure in which the liquid resin is not applied adjacent to the nozzle surface, contamination of the nozzle by a splash of the resin is suppressed, a defect such as failure and a liquid pool due to stray ink or non-ejection caused by positional displacement of the dispenser is reduced, and the uniform height is implemented.

Modification of First Embodiment

Figure 4A:
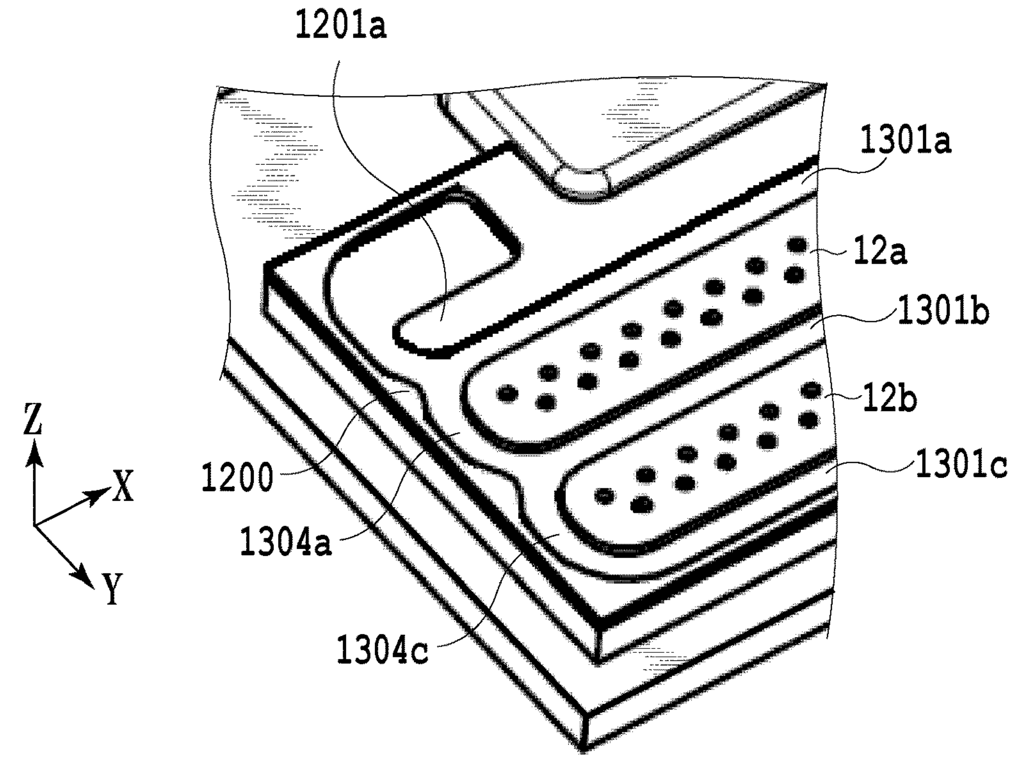
FIG. 4A illustrates the liquid ejection unit of a modification of the first embodiment.

A modification of the first embodiment is described with reference to the drawings. FIG. 4 illustrates the liquid ejection unit 300 before the resin injection. FIG. 4A is a partial perspective view of the liquid ejection unit 300 before the resin injection, and FIG. 4B is a partial perspective view of the liquid ejection unit 300 in the resin injection.

As illustrated in FIG. 4A, a part of the dam 1200 facing two ends of the nozzle plates 12*a* to 12*b* in a longitudinal direction has a curve that matches a curve of end portions of the nozzle plates 12*a* to 12*b*, and widths of the grooves 1304*a* and 1304*c* at the end portion may be equal to the widths of the grooves 1301*a* to 1301*c*. Additionally, a part of the facing dam 1200 has a curved shape that matches a curve at the other end portion of the nozzle plates 12*a* to 12*b*.

Figure 4B:
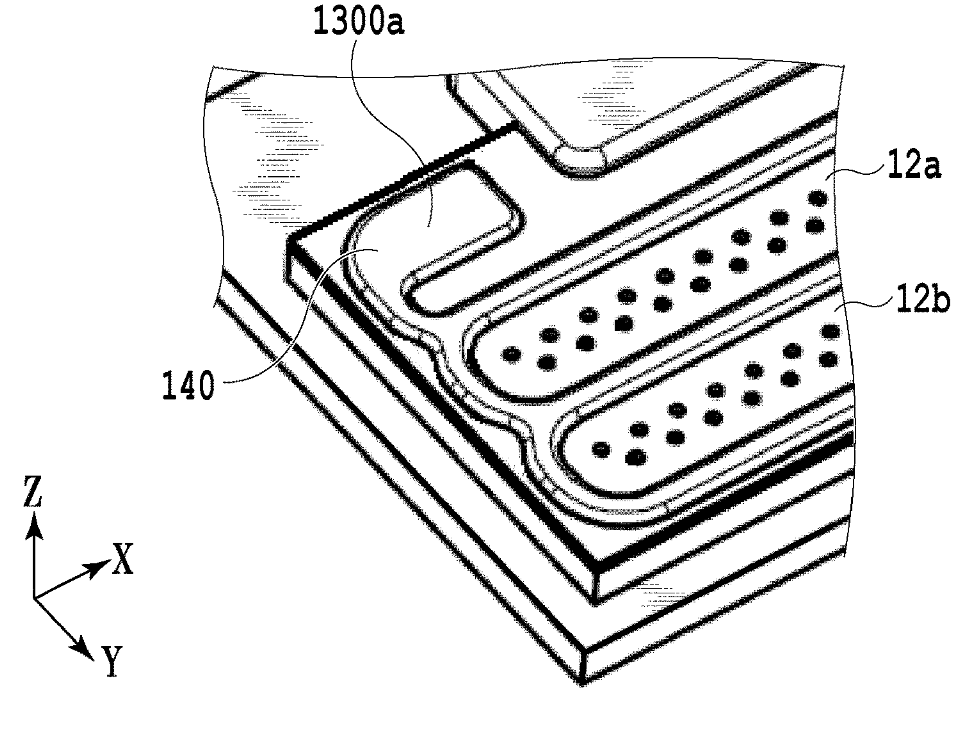
FIG. 4B illustrates the liquid ejection unit of a modification of the first embodiment.

As illustrated in FIG. 4B, with the same method as that of the first embodiment, the liquid resin 140 is injected into the liquid resin pooling portions 1300*a* to 1300*b* and flows to the grooves. With the curved shape of the dam 1200 that matches the shape of the end portion of the nozzle plate, the flow rate of the resin flowing through the grooves surrounding the nozzle plates 12*a* to 12*b* is uniform, and the uniformity of the shape of the resin portion is improved.

Second Embodiment (Liquid Ejection Head)

Figure 5:
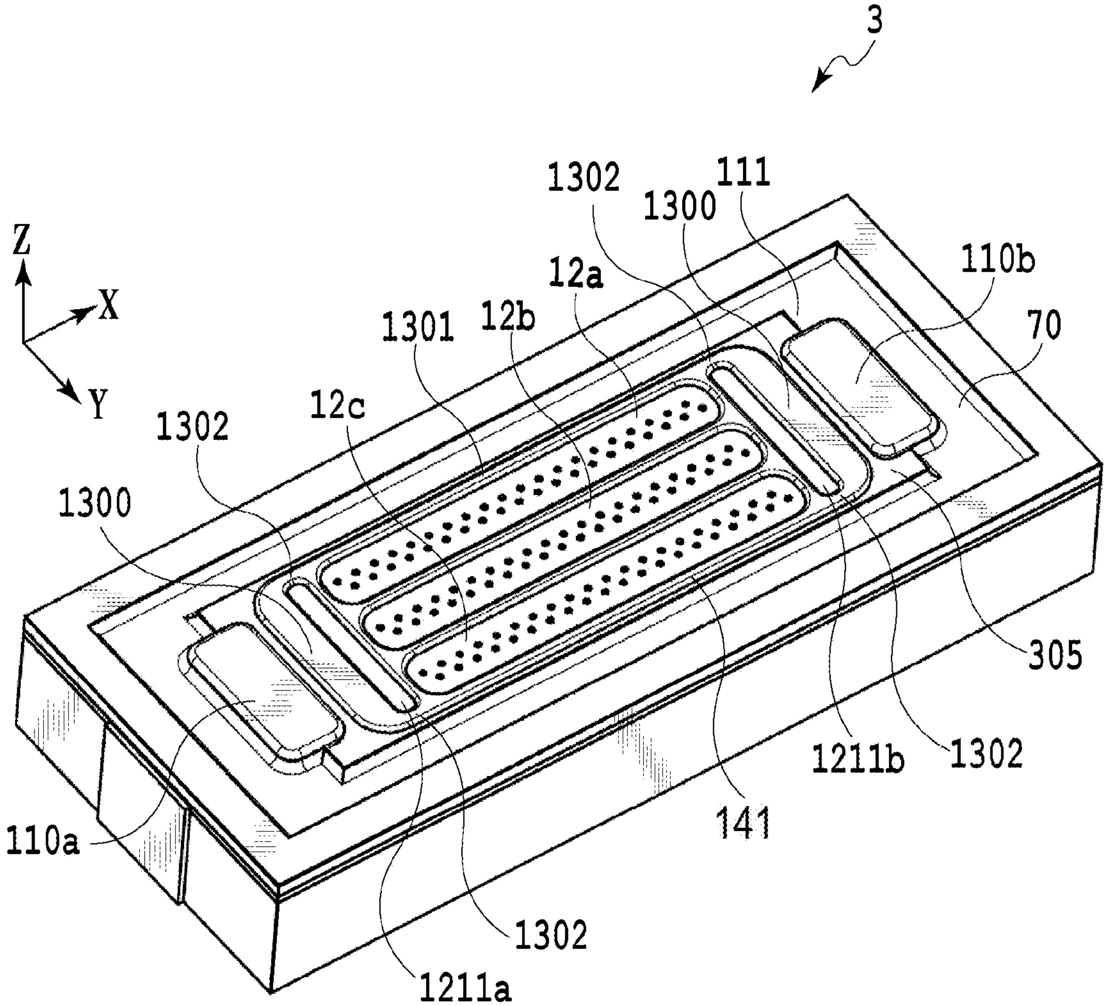
FIG. 5 illustrates a perspective view of the liquid ejection head of a second embodiment.

The liquid ejection head 3 of the present disclosure includes the printing element substrate 10 including nozzle plates 12*a* to 12*c* and the groove 1301 surrounding the nozzle plates 12*a* to 12*c* and multiple communication portions 1302, the liquid resin pooling portion 1300, and the resin portion 141, which are formed on the printing element substrate 10. The resin portion 141 is provided in the groove 1301, the multiple communication portions 1302, and the liquid resin pooling portion 1300. FIG. 5 illustrates the liquid ejection head 3 of a second embodiment. The liquid ejection head 3 includes the housing including the support member 30 and the frame member 50 and a liquid ejection unit 305 arranged in the housing. The support plate 70 includes the liquid flow channel to supply the ink to the nozzle plates through the printing element substrate 10. The liquid ejection unit 305 is arranged in the housing and is fixed by the sealing member 111 filled in a periphery thereof.

(Liquid Ejection Unit)

Figure 6A:
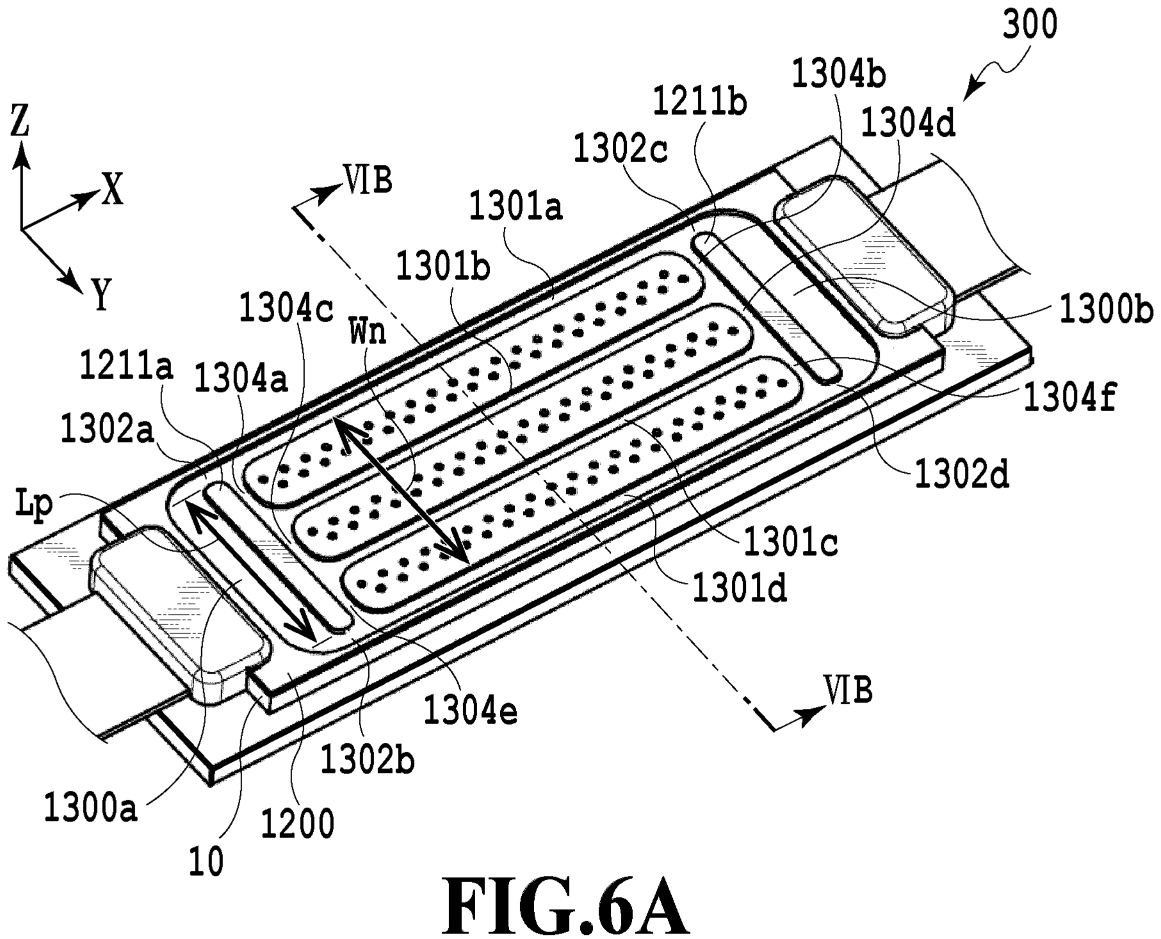
FIG. 6A illustrates the liquid ejection unit before the protection structure of the second embodiment is manufactured.
Figure 6B:
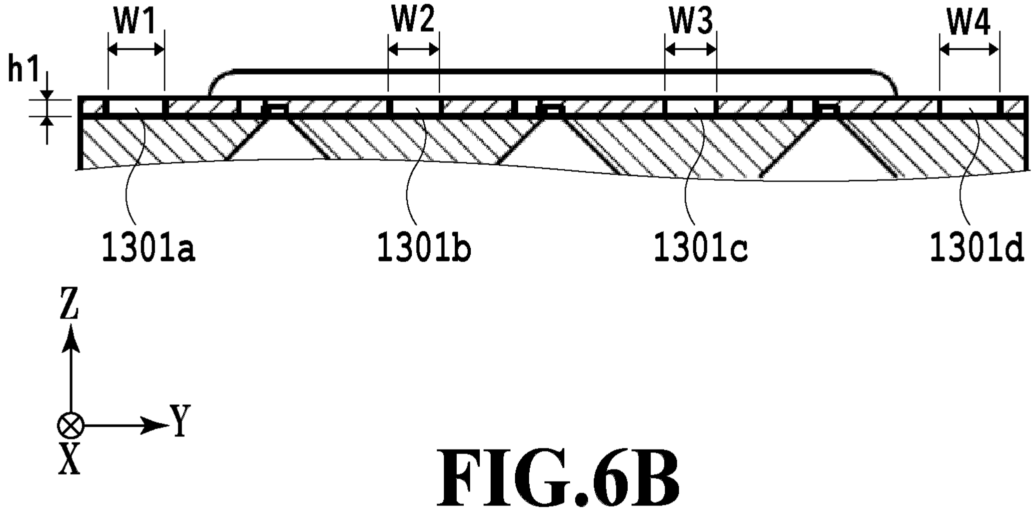
FIG. 6B illustrates the liquid ejection unit before the protection structure of the second embodiment is manufactured.

FIG. 6 illustrates the liquid ejection unit 305 before the resin injection. FIG. 6A is a perspective view of the liquid ejection unit 305 before the resin injection, and FIG. 6B is a cross-sectional view of the liquid ejection unit 305 that is taken along VIb-VIb.

As illustrated in FIG. 6A, the liquid ejection unit 305 includes the support plate 70, the printing element substrate 10, the nozzle plates 12*a* to 12*c*, the dam 1200, partition walls 1211*a* to 1211*b*, and sealing members 110*a* to 110*b*. The printing element substrate 10 is an Si substrate having a thickness of about 0.6 mm to 1 mm and includes an electric circuit, a heat generation resistor, two terminals producing an electric connection, and a flow channel arranged therein. The printing element substrate 10 is parallel to the X axis and Y axis and forms a plane. The printing element substrate 10 is arranged on the support plate 70 and is electrically connected with the flexible wiring substrate 40 applying a driving signal and the like from the printing apparatus main body. The flow channel arranged in the printing element substrate 10 is in fluid communication with the liquid flow channel in the support plate 70.

The nozzle plates 12*a* to 12*c* are arranged on the printing element substrate 10 and each include the ejection port 13 that ejects an ink droplet. The ejection port 13 is in fluid communication with the flow channel in the support plate 70 and the flow channel in the printing element substrate 10. The dam 1200 is arranged on the printing element substrate 10 and surrounds the nozzle plates 12*a* to 12*c* and the partition walls 1211*a* to 1211*b* at a distance therefrom. The partition walls 1211*a* to 1211*b* are positioned on two sides of the nozzle plates in the longitudinal direction, arranged at a distance from the nozzle plates 12*a* to 12*c* and the dam 1200 in a region of the printing element substrate 10 defined by the dam 1200. Opposite surfaces of surfaces of the nozzle plates 12*a* to 12*c*, the dam 1200, and the partition walls 1211*a* to 1211*b*, which are in contact with the printing element substrate, may be subjected to water-repellent treatment. The nozzle plates 12*a* to 12*c*, the dam 1200, and the partition walls 1211*a* to 1211*b* may be formed by patterning a water-repellent treated surface.

Next, a groove to form the resin portion is described. The nozzle plates 12*a* to 12*c*, the dam 1200, and the partition walls 1211*a* to 1211*b* define grooves 1301*a* to 1301*d* and grooves 1304*a* to 1304*f* surrounding the nozzle plates on the printing element substrate 10. The dam 1200 and the partition walls 1211*a* to 1211*b* define communication portions 1302*a* to 1302*d* and the liquid resin pooling portions 1300*a* to 1300*b* on the printing element substrate 10. The liquid resin pooling portion 1300*a* is in communication with each of the grooves 1301*a* to 1301*d* and the grooves 1304*a* to 1304*f* through the communication portions 1302*a* to 1302*b*, and the liquid resin pooling portion 1300*b* is in communication with each of the grooves 1301*a* to 1301*d* and the grooves 1304*a* to 1304*f* through the communication portions 1302*c* to 1302*d*. The grooves 1301*a* to 1301*d* and the grooves 1304*a* to 1304*f* may be referred to as a first groove, and the liquid resin pooling portions may be referred to as a second groove.

The groove, the communication portion, and the liquid resin pooling portion each include a corner portion in a view from the Z direction, and the corner portion may have an arc shape. The sealing members 110*a* to 110*b* cover the electric connection portion between the printing element substrate 10 and the flexible wiring substrate 40 and are arranged at a distance from the grooves 1301*a* to 1301*d*, the grooves 1304*a* to 1304*f*, the communication portions 1302*a* to 1302*d*, and the liquid resin pooling portions 1300*a* to 1300*b*.

As illustrated in FIG. 6B, the nozzle plates 12*a* to 12*c*, the dam 1200, and the partition walls 1211*a* to 1211*b* may have the equal height h1 in the +Z direction from the printing element substrate 10, and the height h1 may be 0.02 mm to 0.05 mm. Widths w1 to w4 of the grooves 1301*a* to 1301*d* may be equal to each other, and each of the widths w1 to w4 may be 0.1 mm to 0.3 mm. The liquid resin pooling portions 1300*a* to 1300*b* secure a sufficient region for the accuracy of the resin application and the splashing of the resin. A length Lp of the partition walls 1211*a* to 1211*b* in the longitudinal direction is equal to a width Wn of the multiple nozzle plates arranged parallel to each other.

(Molding Method)

Next, a method of applying the liquid resin 140 to the liquid ejection unit 305 is described.

Figure 7A:
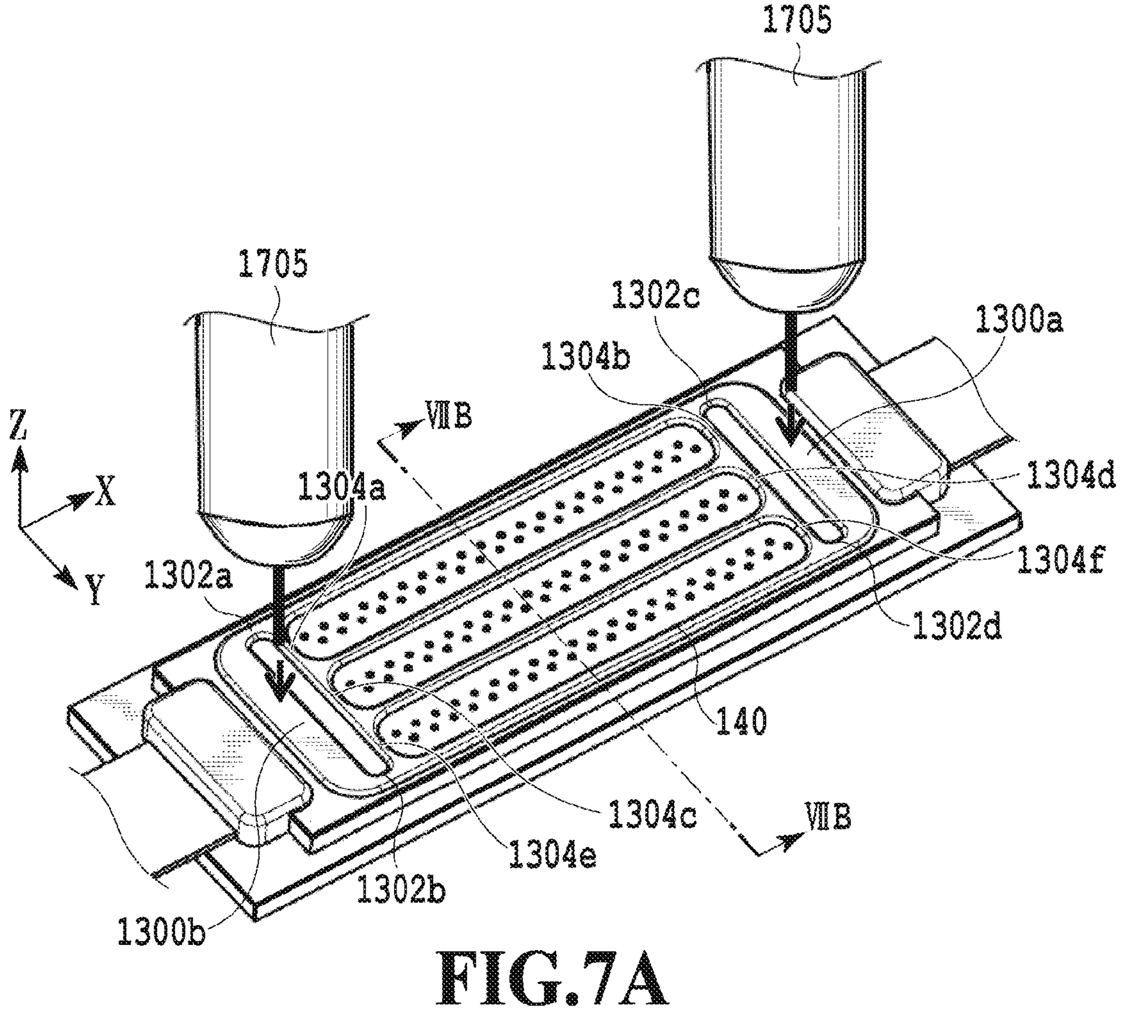
FIG. 7A illustrates a manufacturing process of the protection structure of the liquid ejection unit of the second embodiment.
Figure 7B:
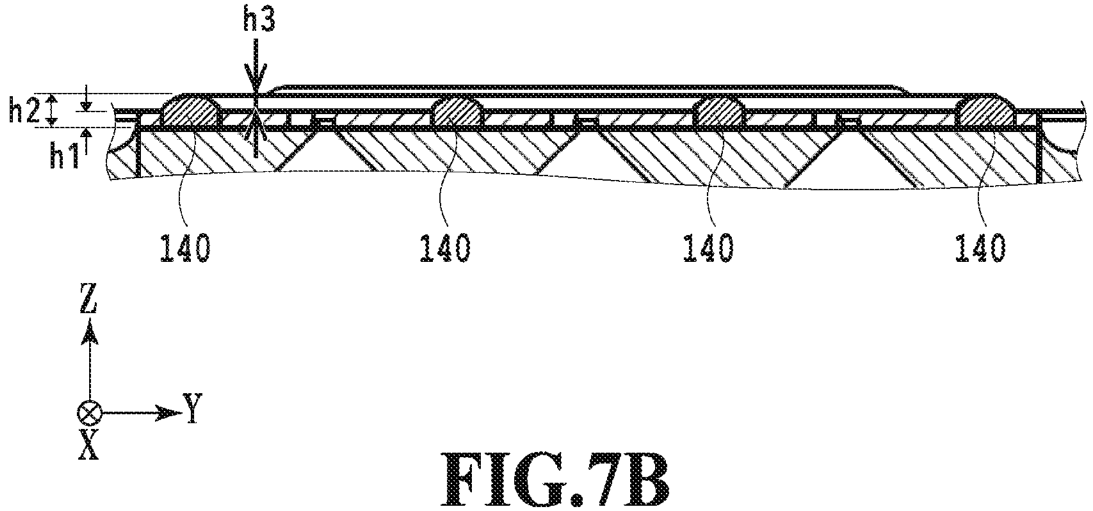
FIG. 7B illustrates a manufacturing process of the protection structure of the liquid ejection unit of the second embodiment.

FIG. 7 illustrates the liquid ejection unit 305 in the resin injection. FIG. 7A is a perspective view of the liquid ejection unit 305 in the resin injection, and FIG. 7B is a cross-sectional view of the liquid ejection unit 305 that is taken along VIIb-VIIb.

As illustrated in FIG. 7A, two liquid resin containers 1705 inject the liquid resin into the liquid resin pooling portions 1300*a* to 1300*b*. The liquid ejection unit 300 is heated to 40° C. to 70° C. by the work fixation stage 1704 (not illustrated), and thus the viscosity of the liquid resin 140 applied to the liquid resin pooling portions is reduced. The liquid resin 140 is heated for three to ten minutes and flows to the grooves 1301*a* to 1301*d* and the grooves 1304*a* to 1304*f* from the liquid resin pooling portion 1300*a* through the communication portions 1302*a* to 1302*b* and from the liquid resin pooling portion 1300*b* through the communication portions 1302*c* to 1302*d*. Subsequently, the liquid resin 140 fills the liquid resin pooling portions 1300*a* to 1300*b*, the communication portions 1302*a* to 1302*d*, the grooves 1301*a* to 1301*d*, and the grooves 1304*a* to 1304*f*.

As illustrated in FIG. 7B, the nozzle plates 12*a* to 12*c*, the dam 1200, and the partition walls 1211*a* to 1211*b* have the same heights h1, and the corner portions of the liquid resin pooling portions 1300*a* to 1300*b*, the communication portions 1302*a* to 1302*d*, the grooves 1301*a* to 1301*d*, and the grooves 1304*a* to 1304*f* have an arc shape. These shapes can allow the liquid resin 140 filled in the groove to maintain the surface tension and to swell in the +Z direction to be higher than the height h1 while preventing leaking to the outside. The equal widths of the grooves 1301*a* to 1301*d* may uniform heights of protrusion shapes formed by the surface tension of the liquid resin 140 overall.

(Curing of Resin)

After the filling of the liquid resin 140, the liquid ejection unit 300 may be detached from the stage 1704, put into the oven, heated at 80° C. to 160° C. for two to six hours, and thermally cured. The liquid resin 140 after the thermal curing has a higher elasticity than that of the nozzle plates 12*a* to 12*c*.

Alternatively, the liquid resin 140 may be ultraviolet ray curable liquid resin, and after the filling of the liquid resin 140, the liquid resin may be cured by irradiation with ultraviolet rays. The liquid resin 140 after the ultraviolet ray curing has a higher elasticity than that of the nozzle plates 12*a* to 12*c*.

The cured liquid resin 141 surrounds the nozzle plates 12*a* to 12*c*, has the height h2, and forms a protection structure protruding in the direction crossing a surface of the nozzle plate. It is h1<h2, and the difference h3 between h2 and h1 may be 0.03 mm to 0.1 mm, for example.

The numbers of the above-described liquid resin pooling portions, communication portions, and grooves are an example, and it is not limited to the above-described numbers. According to the present embodiment, the liquid resin pooling portion 1300*a* is in communication with each groove through the communication portions 1302*a* to 1302*b*, and the liquid resin pooling portion 1300*b* is in communication with each groove through the communication portions 1302*c* to 1302*d*; therefore, it is possible to shorten the filling time of the resin.

The liquid ejection unit 305 including the protection structure molded by the resin 140 is subsequently arranged in the housing formed by the support member 30 and the frame member 50 and may be fixed by the sealing member 111 filled in the periphery of the liquid ejection unit 305.

<Resin Molding Device>

Figure 8:
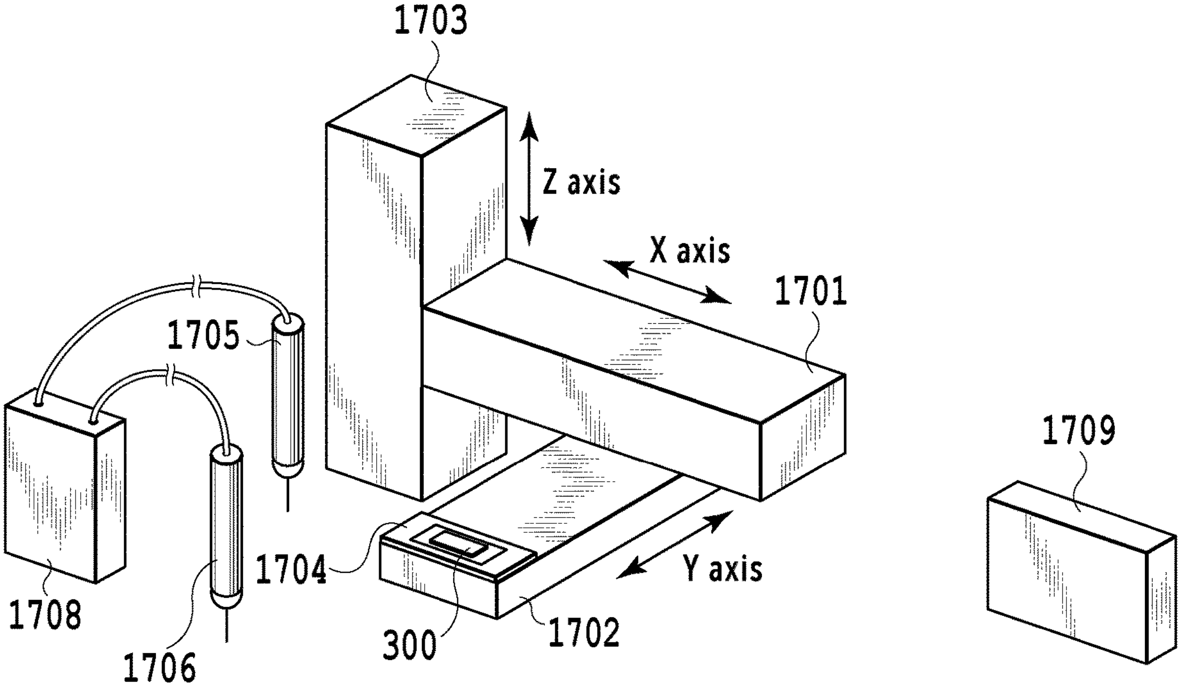
FIG. 8 illustrates a schematic configuration diagram of a manufacturing device used in an embodiment of the present disclosure.

FIG. 8 illustrates a molding device of the liquid resin 140. The injection of the liquid resin 140 into the liquid ejection unit is executed by the molding device illustrated in FIG. 8. Movement arms A1701, B1702, and C1703 of a manufacturing device position the liquid ejection unit by moving in the X axis direction, the Y axis direction, and the Z axis direction, respectively. The liquid resin 140 is pushed out from the liquid resin container 1705 by air pressurized and supplied by a pressurization device 1708 and is injected into the liquid resin pooling portion. The work fixation stage 1704 on which the liquid ejection unit 300 is arranged heats the liquid ejection unit 300 to 40° C. to 70° C. Thus, the viscosity of the liquid resin 140 is reduced, and after leaving for three to ten minutes, the liquid resin 140 flows from the liquid resin pooling portion to the groove through the communication portion. The liquid resin 140 fills the liquid resin pooling portion, the groove, and the communication portion and swells by the surface tension to be higher than the height h1 of the nozzle plate.

Figure 9:
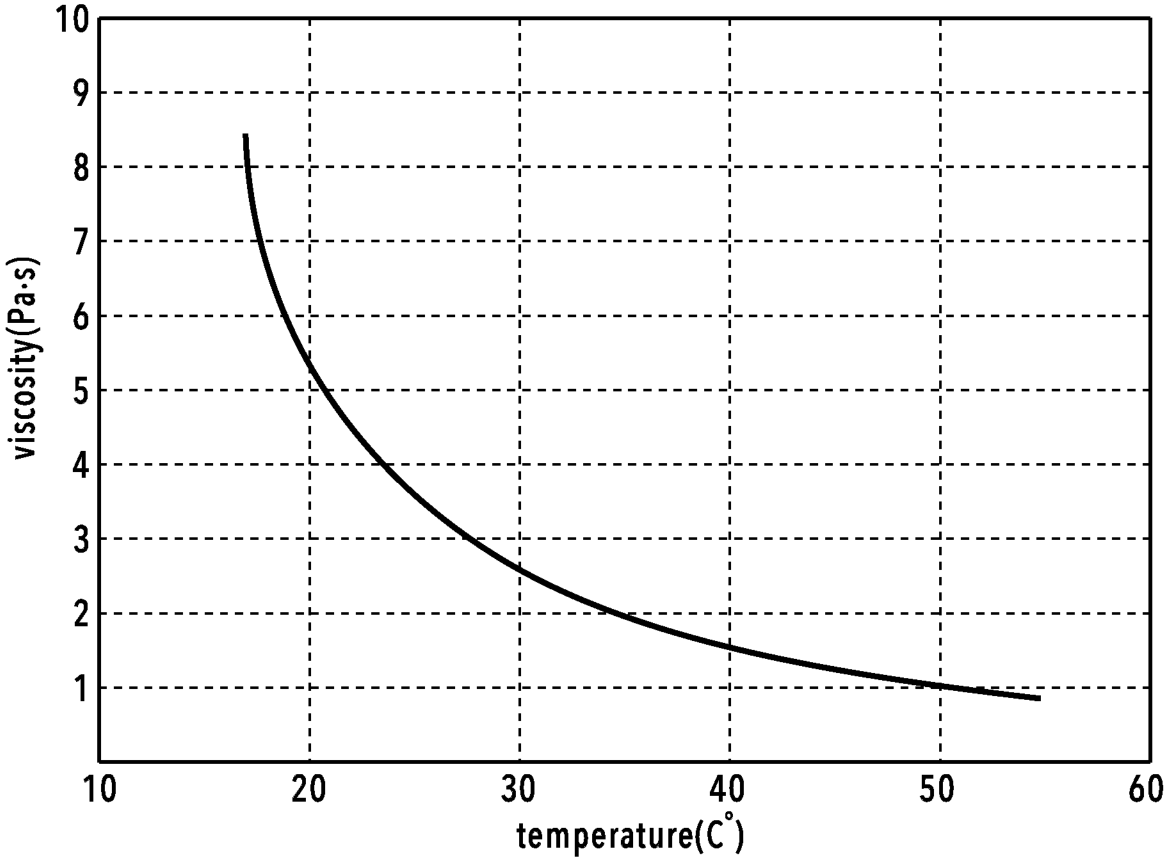
FIG. 9 illustrates an explanatory diagram of viscosity characteristic of liquid resin used in the embodiment of the present disclosure.

FIG. 9 illustrates the viscosity characteristic of the liquid resin used in the present embodiment. With this characteristic, in the heating of the liquid ejection unit, the viscosity of the resin applied to the liquid resin pooling portion is reduced, and the resin can flow to the groove.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-211358, filed Dec. 28, 2022, which is hereby incorporated by reference wherein in its entirety.

What is claimed is:

1. A liquid ejection head including a printing element substrate including a plate provided with an ejection port from which ink is ejected, comprising:
- a first groove that is provided around the plate of the printing element substrate;
- a second groove that is provided on the printing element substrate and in communication with the first groove through a communication portion; and
- a resin portion that is provided in the first groove, the communication portion, and in the second groove and protrudes from the plate in a direction crossing a surface of the plate.

2. The liquid ejection head according to claim 1, wherein
- the printing element substrate includes a dam and a partition wall,
- the dam defines the first groove by surrounding the plate at a distance from the plate, and
- the partition wall and the dam define the second groove and the communication portion.

3. The liquid ejection head according to claim 1, wherein a corner portion of the first groove, a corner portion of the communication portion, and a corner portion of the second groove are in an arc shape.

4. The liquid ejection head according to claim 2, wherein the plate, the dam, and the partition wall have a same height.

5. The liquid ejection head according to claim 2, wherein opposite surfaces of surfaces of the plate, the dam, and the partition wall in contact with the printing element substrate are subjected to a water-repellent treatment.

6. The liquid ejection head according to claim 4, wherein a height of the resin portion is higher than the same height by 0.03 mm to 0.1 mm.

7. The liquid ejection head according to claim 1, further comprising:

a plurality of communication portions, wherein the second groove is in communication with the first groove through the plurality of communication portions.

8. The liquid ejection head according to claim 1, wherein the resin portion is resin with a viscosity of 1.5 Pa·s or less at 40° C. to 70° C. in liquid form before curing.

9. The liquid ejection head according to claim 1, further comprising:

a plurality of first grooves, wherein the plurality of first grooves have an equal width.

10. A method of manufacturing a liquid ejection head, comprising:

arranging a liquid ejection head that includes a printing element substrate including a plate provided with an ejection port from which ink is ejected, the liquid ejection head including a first groove that is provided around the plate of the printing element substrate and a second groove that is provided on the printing element substrate and in communication with the first groove through a communication portion;

injecting liquid resin into the second groove;

flowing the liquid resin injected in the second groove to the first groove by heating the printing element substrate; and filling the liquid resin such that the liquid resin protrudes from the plate by surface tension in a direction crossing a surface of the plate.

11. The method of manufacturing the liquid ejection head according to claim 10, wherein in the flowing of the liquid resin, the liquid resin is heated at 40° C. to 70° C.

12. The method of manufacturing the liquid ejection head according to claim 10, further comprising:

curing the liquid resin by heating at 80° C. to 160° C.

13. The method of manufacturing the liquid ejection head according to claim 10, further comprising:

curing the liquid resin by irradiation with ultraviolet rays.

* * * * *